US007740772B2

(12) United States Patent
Gorte et al.

(10) Patent No.: US 7,740,772 B2
(45) Date of Patent: *Jun. 22, 2010

(54) CERAMIC ANODES AND METHOD OF PRODUCING THE SAME

(75) Inventors: Raymond J. Gorte, Narberth, PA (US); John M. Vohs, Newtown Square, PA (US)

(73) Assignee: The Trustees of The University of Pennsylvania, Philadelphia, PA (US)

( * ) Notice: Subject to any disclaimer, the term of this patent is extended or adjusted under 35 U.S.C. 154(b) by 1372 days.

This patent is subject to a terminal disclaimer.

(21) Appl. No.: 10/454,783

(22) Filed: Jun. 5, 2003

(65) Prior Publication Data

US 2004/0043272 A1 Mar. 4, 2004

Related U.S. Application Data

(60) Provisional application No. 60/387,009, filed on Jun. 6, 2002.

(51) Int. Cl.
*H01M 4/86* (2006.01)

(52) U.S. Cl. .................. 252/500; 429/44; 429/45; 429/40; 429/41; 429/33

(58) Field of Classification Search .............. 252/182.1, 252/518.1; 429/30, 33, 44–46, 188, 304; 427/115, 201, 206
See application file for complete search history.

(56) References Cited

U.S. PATENT DOCUMENTS

| | | | | | |
|---|---|---|---|---|---|
| 3,881,957 | A | * | 5/1975 | Hausler | 429/30 |
| 5,273,837 | A | * | 12/1993 | Aitken et al. | 429/30 |
| 5,350,641 | A | * | 9/1994 | Mogensen et al. | 429/30 |
| 5,486,428 | A | * | 1/1996 | Gardner et al. | 429/19 |
| 5,543,239 | A | * | 8/1996 | Virkar et al. | 429/33 |
| 5,670,270 | A | * | 9/1997 | Wallin | 429/33 |
| 5,993,986 | A | * | 11/1999 | Wallin et al. | 429/32 |
| 6,228,521 | B1 | | 5/2001 | Kim et al. | |
| 6,458,170 | B1 | * | 10/2002 | Visco et al. | 29/623.4 |
| 6,492,051 | B1 | | 12/2002 | Gopalan et al. | |
| 6,558,831 | B1 | * | 5/2003 | Doshi et al. | 429/30 |
| 6,589,680 | B1 | * | 7/2003 | Gorte et al. | 429/33 |
| 6,653,009 | B2 | * | 11/2003 | Wang et al. | 429/30 |
| 6,958,196 | B2 | * | 10/2005 | Gorte et al. | 429/44 |
| 2001/0029231 | A1 | * | 10/2001 | Gorte et al. | 502/101 |
| 2001/0053471 | A1 | * | 12/2001 | Gorte et al. | 429/30 |

FOREIGN PATENT DOCUMENTS

WO    WO 99/16140    4/1999

OTHER PUBLICATIONS

Primdahl et al, "Sr-doped LaCrO3 Anode for Solid Oxide Fuel Cells," J. Electrochemical Society, 2001, 148(1), A74-A81.*
Kharton,"Mixed electronic and ionic conductivity of LaCo(M)O3 (M=Ga,Cr,Fe or Ni) II. Oxygen permeation through Cr- and Ni-substituted LaCoO3," Solid State Ionics, 1998, 110, pp. 53-60.*

(Continued)

*Primary Examiner*—Stanley Silverman
*Assistant Examiner*—Kallambella Vijaykumar
(74) *Attorney, Agent, or Firm*—Woodcock Washburn, LLP

(57) ABSTRACT

The present invention generally relates to ceramic anodes for use in solid oxide fuel cells, whereby the anodes are comprised primarily of ceramic material.

21 Claims, 8 Drawing Sheets

OTHER PUBLICATIONS

Eguchi K. et al., Electrical properties of ceria-based oxides and their application to solid oxide fuel cells, *Solid State Ionics*, 52, pp. 165-172 (1992).

Mogensen G., Physical Properties of Mixed Conductor Solid Oxide Fuel Cell Anodes of Doped $CeO_2$, *Journal of the Electrochemical Society*, 141, pp. 2122-2128 (1994).

Putna, E.S. et al., Ceria-Based Anodes for the Direct Oxidation of Methane in Solid Oxide Fuel Cells, *Langmuir*, 11, 4832 (1995).

Baker R.T. et al., Evaluation of perovskite anodes for the complete oxidation of dry methane in solid oxide fuel cells, *Solid State Ionics*, 72, pp. 328-333 (1994).

Asano, K. et al., A Novel Solid Oxide Fuell Cell System Using the Partial oxidation of Methane, *Journal of the Electrochemical Society*, 142, pp. 3241-3245 (1995).

Hiei Y. et al., Partial oxidation of methane for internally reformed solid oxide fuel cell, *Solid State Ionices*, pp. 1267-1272, 86-88 (1996).

Doshi, R. et al., $LaCrO_3$, *J. Catal.* 140, pp. 557-563 (1993).

Sfeir J. et al., Stability of Calcium Substitued Lanthanum Chromites used as SOFC Anodes for Methane Oxidation, *J. Eur. Ceram. Cos.*, 19, pp. 897-902 (1999).

Weston M. et al., $La_{0.6}Sr_{0.4}CO_{0.2}Fe_{0.8}O_3$ as an anode for direct methane activation in SOFCS, *Solid State Ionics*, 113-115, pp. 247-251 (1998).

Lui J. et al., A Fuel-Flexible Ceramic-Based Anode for Solid Oxide Fuel Cells, *Electrochem. & Solid-State Lett.*, 5, pp. A122-124 (2002).

S. Park et al., Direct oxidation of hydrocarbons in a solid -oxide fuel cell, *Nature*, 404, pp. 265-267 (2000).

Gorte R. J. et al., Anodes for Direct Oxidation of Dry Hydrocarbons in a Solid-Oxide Fuel Cell, *Adv. Materials*, 12 pp. 1465-1469 (2000).

S. Park et al., Direct Oxidation of Hydrocarbons in a Solid Oxide Fuel Cell: I. Methane Oxidation, *J. Electrochem. Soc.*, 146, pp. 1-2(1999).

S. Park et al., Tape Cast Solid Oxide Fuel Cells for the Direct Oxidation of Hydrocarbons, *J. Electrochem. Soc.*, 148, A443 (2001).

Kim H. et al., Fabrication of Highly Porous Yttria-Stabilized Zirconia by Acid Leaching Nickel from a Nickel-Yttria-Stabilized Zirconia Cermet, *J. Am. Ceram. Soc.*, 85, pp. 1473-1476 (2002).

PCT International Search Report, PCT/US03/17735, (Dec. 1, 2003).

* cited by examiner

CERAMIC ANODES AND METHOD OF PRODUCING THE SAME

This application claims priority to provisional application No. 60/387,009, filed on Jun. 6, 2002, entitled: "Method for Fabricating Ceramic Anodes for Direct-Oxidation Solid-Oxide Fuel Cells," the disclosure of which is incorporated by reference herein in its entirety.

FIELD OF THE INVENTION

The present invention relates generally to solid oxide fuel cells (SOFC) and to methods of their preparation. Specifically, the invention relates to ceramic anodes and to methods of producing them whereby the ceramic anodes include electronically conductive oxides in place of conductive metals, such as Ni, Fe, and Co, that are disposed at least partially with the pores of a ceramic anode support material. Other components and methods can be used to improve the electrical conductivity and fuel efficiency of the fuel cell.

DESCRIPTION OF RELATED ART

Solid oxide fuel cells have grown in recognition as a viable high temperature fuel cell technology. There is no liquid electrolyte, which eliminates metal corrosion and electrolyte management problems typically associated with the use of liquid electrolytes. Rather, the electrolyte of the cells is made primarily from solid ceramic materials that are capable of surviving the high temperature environment typically encountered during operation of solid oxide fuel cells. The operating temperature of greater than about 600° C. allows internal reforming, promotes rapid kinetics with non-precious materials, and produces high quality by-product heat for cogeneration or for use in a bottoming cycle. The high temperature of the solid oxide fuel cell, however, places stringent requirements on its fabrication materials. Because of the high operating temperatures of conventional solid oxide fuel cells (approximately 600 to 1000° C.), the materials used to fabricate the respective cell components are limited by chemical stability in oxidizing and reducing environments, chemical stability of contacting materials, conductivity, and thermomechanical compatibility.

The most common anode materials for solid oxide fuel cells are nickel (Ni)-cermets prepared by high-temperature calcination of NiO and yttria-stabilized zirconia (YSZ) powders. High-temperature calcination usually is considered essential in order to obtain the necessary ionic conductivity in the YSZ. These Ni-cermets perform well for hydrogen ($H_2$) fuels and allow internal steam reforming of hydrocarbons if there is sufficient water in the feed to the anode. Because Ni catalyzes the formation of graphite fibers in dry methane, it is necessary to operate anodes made using nickel at steam/methane ratios greater than one. Direct oxidation of higher hydrocarbons without the need for steam reformation is possible and described, inter alia, in U.S. Patent Application Publication Nos. 20010029231, and 20010053471.

Because Ni is known to catalyze the formation of graphite and require steam reformation, some anodes have been prepared that do not require such high steam/methane ratios whereby an entirely different type of anode was used, either based on doped ceria (Eguchi, K., et al., *Solid State Ionics*, 52, 165 (1992); Mogensen, G., *Journal of the Electrochemical Society*, 141, 2122 (1994); and Putna, E. S., et al., *Langmuir*, 11, 4832 (1995)) perovskite (Baker, R. T., et al., *Solid State Ionics*, 72, 328 (1994); Asano, K., et al., *Journal of the Electrochemical Society*, 142, 3241 (1995); and Hiei, Y., et al., *Solid State Ionics*, 1267, 86-88 (1996)), $LaCrO_3$ and $SrTiO_3$ (Doshi, R., et al., *J. Catal.* 140, 557 (1993); Sfeir, J., et al., *J. Eur. Ceram. Cos.*, 19, 897 (1999); Weston, M., et al., *Solid State Ionics*, 247, 113-115, (1998); and Liu, J., et al., *Electrochem. & Solid-State Lett.*, 5, A122 (2002), or copper based anodes (U.S. Patent Application Publication Nos. 20010029231, and 20010053471, the disclosures of which are incorporated by reference herein in their entirety). Replacement of Ni for other metals, including Co (Sammnes, N. M., et al., *Journal of Materials Science*, 31, 6060 (1996)), Fe (Bartholomew, C. H., CATALYSIS REVIEW-Scientific Engineering, 24, 67 (1982)), Ag or Mn (Kawada, T., et al., *Solid State Ionics*, 418, 53-56, (1992)) also has been considered.

Based on the catalytic properties of various electronic conductors that could be used in the anode, Cu-based anodes have been developed for use in SOFC(S. Park, et al., *Nature*, 404, 265 (2000); R. J. Gorte, et al., *Adv. Materials*, 12, 1465 (2000); S. Park, et al., *J. Electrochem. Soc.*, 146, 3603 (1999); S. Park, et al., *J. Electrochem. Soc.*, 148, A443 (2001); and H. Kim, et al., *J. Am. Ceram. Soc.*, 85, 1473 (2002). Compared to Ni, Cu is not catalytically active for the formation of C—C bonds. Its melting temperature, 1083° C., is low compared to that of Ni, 1453° C.; however, for low-temperature operation, (e.g., <800° C.), Cu is likely to be sufficiently stable.

Because $Cu_2O$ and CuO melt at 1235 and 1326° C. respectively, temperatures below that necessary for densification of YSZ electrolytes, it is not possible to prepare Cu-YSZ cermets by high-temperature calcination of mixed powders of CuO and YSZ, a method analogous to that usually used as the first step to produce Ni-YSZ cermets. An alternative method for preparation of Cu-YSZ cermets was therefore developed in which a porous YSZ matrix was prepared first, followed by addition of Cu and an oxidation catalyst in subsequent processing steps (R. J. Gorte, et al., *Adv. Materials*, 12, 1465 (2000); S. Park, et al., *J. Electrochem. Soc.*, 148, A443 (2001)). Because the Cu phase in the final cermet must be highly connected, high metal loadings are necessary; and, even then, connectivity between all Cu particles in the anode structure is not assured.

Due to the reported shortcomings of some of the conductive metals used in the anode of a solid oxide fuel cell, some have proposed the use of electronically conductive oxides, for example, $LaCrO_3$ and $SrTiO_3$. These oxides will not catalyze the formation of graphite in the manner that Ni, Fe, and Co do, and consequently, electronically conductive ceramic oxides have been considered as suitable replacements for these metals in anodes. Doshi, R., et al., *J. Catal.*, 140, 557 (1993); Sfeir, J., et al., *J. Eur. Ceram. Cos.*, 19, 897 (1999); Weston, M., et al., *Solid State Ionics*, 247, 113-115, (1998); and Liu, J., et al., *Electrochem. & Solid-State Lett.*, 5, A122 (2002).

A problem associated with using these types of ceramics in an anode is that they are difficult to synthesize. Typically, an electrode fabricated from conductive oxides is in the form of a composite, together with the material used as the electrolyte. For example, if the electrolyte were YSZ, the electrode would be formed by mixing powders of YSZ and the conductive oxide and attaching them to a dense layer of YSZ (e.g., the electrolyte layer). The mixture of electronically conductive oxide and YSZ then usually is calcined to a temperature that is high enough to allow the YSZ to sinter so as to form an intimate connection between the YSZ in the electrolyte and the YSZ in the electrode. This synthesis can be problematic for at least two reasons.

First, La and Sr can react to form $La_2Zr_2O_7$ and $SrZrO_3$ after high temperature calcination. See, e.g., Hirschenhofer, D. B., et al., "Fuel Cells A Handbook (Revision 3)," U.S.

DOE, pp 5-12 (1994). These particular materials are insulating in nature and harmful to the performance of the SOFC. Second, the coefficient of thermal expansion (CTE) of the electronically conductive ceramic oxide has to be similar to or the same as the CTE of the ceramic oxide used as the electrolyte. If there is a mismatch between the CTE of the oxides in the electrode, the electrode likely will be unstable due to stresses induced during heating and cooling of the composite. This matching of the CTEs usually requires modification of the electronically conductive oxide, such as by the addition of Sr and Mn to $LaCrO_3$. See, e.g., Liu, et al., *Electrochem. & Solid-State Lett.*, 5, A122 (2002). This modification may lead to materials with poorer electronic and catalytic properties.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It would be desirable to provide a solid oxide fuel cell that has high fuel efficiency, electrical conductivity, high power, and is capable of directly oxidizing hydrocarbons. It also would be desirable to provide anode materials, and methods of preparing the anode materials for use in solid oxide fuel cells, whereby the materials are capable of direct oxidation of hydrocarbons and can be fabricated at lower temperatures. A feature of an embodiment of the invention therefore is to provide a solid oxide fuel cell that has high fuel efficiency, electrical conductivity, high power, and is capable of directly oxidizing hydrocarbons, as well as anode materials, methods of making the anode materials, and methods of making the solid oxide fuel cells.

In accordance with these and other features of various embodiments of the present invention, there is provided an anode comprising a porous ceramic matrix comprising a first ceramic material, and an electronically conductive ceramic material comprised of a second ceramic material that is disposed at least partially within the pores of the porous ceramic matrix. It is preferred that the anode be substantially free of electronically conductive metals.

In accordance with an additional feature of an embodiment of the invention, there is provided a method of making an anode comprising forming a porous ceramic matrix from a first ceramic material, adding an electronically conductive ceramic material comprised of a second ceramic material to the porous ceramic matrix, and heating the resulting porous structure to form the anode.

In accordance with another feature of an embodiment of the invention, there is provided a solid oxide fuel cell comprising a solid electrolyte, a cathode material, and an anode comprising a porous ceramic matrix comprising a first ceramic material, and an electronically conductive ceramic material comprised of a second ceramic material that is disposed at least partially within the pores of the porous ceramic matrix.

In accordance with yet another feature of an embodiment of the invention, there is provided a method of making a solid oxide fuel cell comprising forming a porous ceramic matrix material comprised of a first ceramic material and having at least two opposing surfaces, contacting one of the surfaces with a cathode material, and contacting the opposing surface with an anode material. The anode material includes an electronically conductive ceramic material comprised of a second ceramic material. The anode material thus formed after the contacting then is heated to form the anode.

These and other features and advantages of the preferred embodiments will become more readily apparent upon reading the following detailed description of the preferred embodiments.

DETAILED DESCRIPTION OF THE PREFERRED EMBODIMENTS

Figure 1:
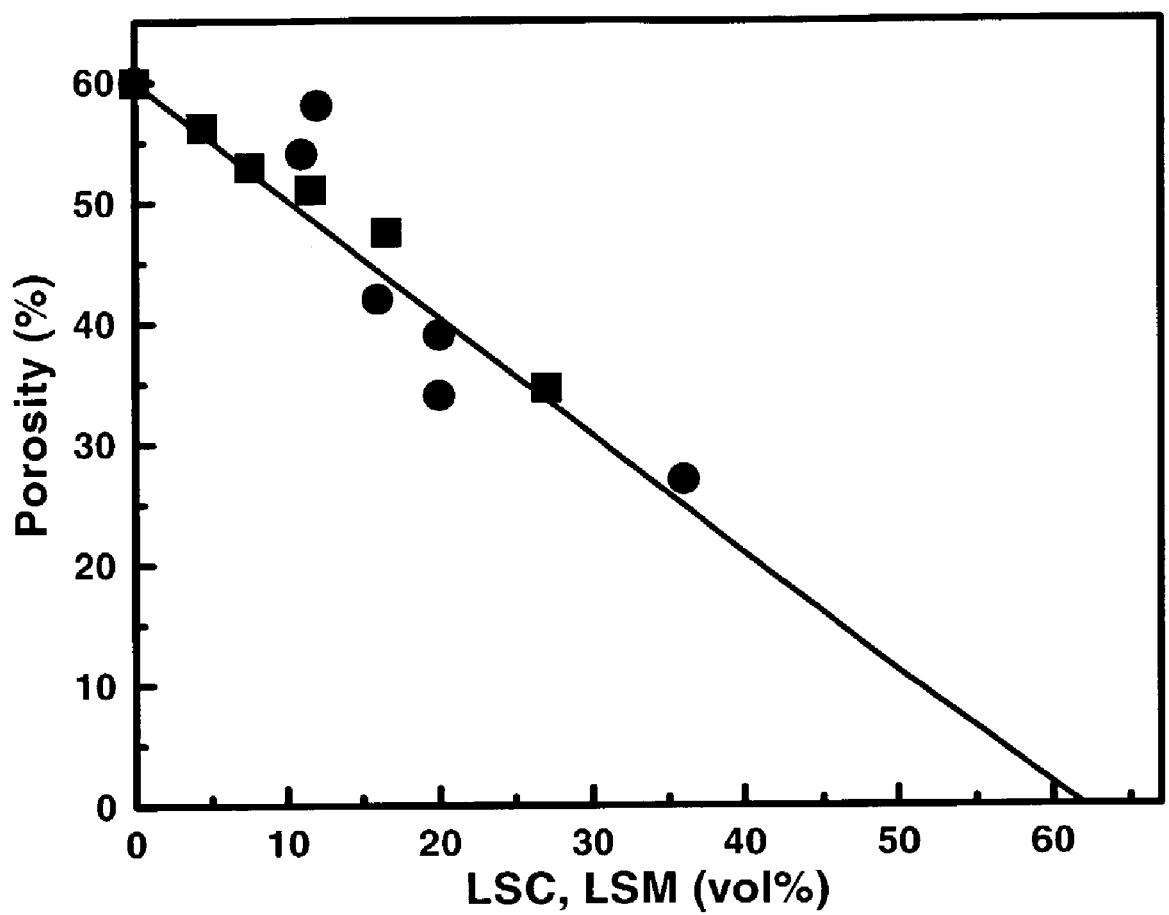
FIG. 1 is a graph showing the porosity of composites prepared in accordance with the present invention having varying concentrations of electronically conducting material.

The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a solid oxide fuel cell" includes a plurality of such fuel cells in a stack, as well as a single cell, and a reference to "an anode" is a reference to one or more anodes and equivalents thereof known to those skilled in the art, and so forth.

The expression "substantially no metal" means that the anode contains less than about 5% by weight of a conductive metal, preferably, less than about 1% by weight, and most preferably no metal. No metal means no metal is added to the anode, although some metal may be present as an impurity.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices, and materials are now described. All publications mentioned herein are cited for the purpose of describing and disclosing the various anodes, electrolytes, cathodes, and other fuel cell components that are reported in the publications and that might be used in connection with the invention. Nothing herein is to be construed as an admission that the invention is not entitled to antedate such disclosures by virtue of prior invention.

Generally, an SOFC is constituted of an air electrode (cathode), a fuel electrode (anode), and a solid oxide electrolyte disposed between these two electrodes. In a SOFC, the electrolyte is in solid form. Typically, the electrolyte is made of a nonmetallic ceramic, such as dense yttria-stabilized zirconia (YSZ) ceramic, that is a nonconductor of electrons, which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the cathode oftentimes being made of doped lanthanum manganite. In the solid oxide fuel cell, hydrogen or a hydrocarbon is commonly used as the fuel and oxygen or air is used as the oxidant.

The SOFC of the present invention can include any solid electrolyte and any cathode made using techniques disclosed in the art. The present invention is not limited to any particular material used for the electrolyte or cathode, nor is it particularly limited to their respective methods of manufacture.

In a similar manner, the invention is not particularly limited to any design of the SOFC. Several different designs for solid oxide fuel cells have been developed, including, for example, a supported tubular design, a segmented cell-in-series design, a monolithic design, and a flat plate design. All of these designs are documented in the literature, including, for example, those described in Minh, "High-Temperature Fuel Cells Part 2: The Solid Oxide Cell," *Chemtech.*, 21:120-126 (1991).

The tubular design usually comprises a closed-end porous zirconia tube exteriorly coated with electrode and electrolyte layers. The performance of this design is somewhat limited by the need to diffuse the oxidant through the porous tube. Westinghouse has numerous U.S. patents describing fuel cell elements that have a porous zirconia or lanthanum strontium manganite cathode support tube with a zirconia electrolyte membrane and a lanthanum chromate interconnect traversing the thickness of the zirconia electrolyte. The anode is coated onto the electrolyte to form a working fuel cell tri-layer, containing an electrolyte membrane, on top of an integral porous cathode support or porous cathode, on a porous zirconia support. Segmented designs proposed since the early 1960s (Minh et al., Science and Technology of Ceramic Fuel Cells, Elsevier, p. 255 (1995)), consist of cells arranged in a thin banded structure on a support, or as self-supporting structures as in the bell-and-spigot design.

Planar designs have been described that make use of free-standing electrolyte membranes. A cell typically is formed by applying single electrodes to each side of an electrolyte sheet to provide an electrode-electrolyte-electrode laminate. Typically these single cells then are stacked and connected in series to build voltage. Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1-2 mm for gas delivery channels.

U.S. Pat. No. 5,273,837 describes sintered electrolyte compositions in thin sheet form for thermal shock resistant fuel cells. The method for making a compliant electrolyte structure includes pre-sintering a precursor sheet containing powdered ceramic and binder to provide a thin flexible sintered polycrystalline electrolyte sheet. Additional components of the fuel cell circuit are bonded onto that pre-sintered sheet including metal, ceramic, or cermet current conductors bonded directly to the sheet as also described in U.S. Pat. No. 5,089,455. U.S. Pat. No. 5,273,837 describes a design where the cathodes and anodes of adjacent sheets of electrolyte face each other and where the cells are not connected with a thick interconnect/separator in the hot zone of the fuel cell manifold. These thin flexible sintered electrolyte-containing devices are superior due to the low ohmic loss through the thin electrolyte as well as to their flexibility and robustness in the sintered state.

Another approach to the construction of an electrochemical cell is disclosed in U.S. Pat. No. 5,190,834 Kendall. The electrode-electrolyte assembly in that patent comprises electrodes disposed on a composite electrolyte membrane formed of parallel striations or stripes of interconnect materials bonded to parallel bands of electrolyte material. Interconnects of lanthanum cobaltate or lanthanum chromite bonded to a yttria stabilized electrolyte are suggested. The SOFC of the present invention may be prepared using any of the techniques described above to provide the desired design, albeit a tubular cell, a monolithic cell, a flat plate cell, and the like. Using the guidelines provided herein, those skilled in the art will be capable of fabricating a SOFC including the inventive anode having any desired design configuration.

The invention preferably includes an anode, a method of making the anode, and a solid oxide fuel cell containing the anode. The inventive anode comprises a porous ceramic matrix comprised of a first ceramic material, and an electronically conductive ceramic material comprised of a second ceramic material disposed at least partially in the pores of the porous ceramic matrix. It is preferred that substantially no electronically conductive metal is employed in the anode.

The anode materials of the present invention preferably is comprised of stabilized YSZ or other electrolyte material impregnated with a second ceramic material. Preferred second ceramic materials for use in the invention include, but are not limited to ceria, doped ceria such as Gd or Sm-doped ceria, $LaCrO_3$, $SrTiO_3$, Y-doped $SrTiO_3$, Sr-doped $LaCrO_3$, (LSC), tungsten carbide (WC), and mixtures thereof. When formulated into the anode together with porous YSZ, the second ceramic material LSC preferably has the formula $La_{0.7}Sr_{0.3}CrO_{3-\delta}$/YSZ. It is understood that the invention is not limited to these particular ceramic materials, and that other ceramic materials may be used in the anode alone or together with the aforementioned ceramic materials. In addition, materials other than stabilized YSZ may be used as the first ceramic material, including Gc- and Sm-doped ceria (10 to 100 wt %), Sc-doped $ZrO_2$ (up to 100 wt %), doped LaGaMnO$_x$, and other electrolyte materials.

In one preferred embodiment of the invention, the anode of the SOFC also contains carbonaceous deposits that are formed by exposing the anode to a hydrocarbon. Preferably, the anode is exposed to a hydrocarbon having greater than one carbon atom, and more preferably to butane. The anode materials preferably are exposed to the hydrocarbon at temperatures within the range of from about 500 to about 900° C., more preferably from about 600 to about 800° C., and most preferably at about 700° C. The exposure to the hydrocarbon can last anywhere from about 1 minute to 24 hours, preferably, from about 5 minutes to about 3 hour, and most preferably from about 10 minutes to about 1 hour, 30 minutes. The anode materials can be exposed to the hydrocarbon once, or numerous times.

The inventors surprisingly discovered that the amount of carbon formed on the anode reaches an equilibrium and consequently, the carbon formed does not completely coat the anode to render it ineffective. While not intending on being bound by any theory, the inventors believe that minor amounts of hydrocarbon residues are deposited on the surface of the anode and fill the gaps between the electron-conducting particles when conductive oxides are included in the anode composition. After treatment with a hydrocarbon having more than one carbon, e.g., butane, the hydrocarbon residues that are formed fill the gaps and improve the conductivity to allow the flow of electrons from the surface of the anode to the conductive particles.

The carbonaceous deposits that can optionally be formed on the electrode preferably are polyaromatic compounds, and more preferably fused benzene rings containing anywhere from 2 to 6 benzene rings fused together. These polyaromatic compounds are distinct from the graphitic carbon fibers that are typically formed when using Ni, Co, and Fe in the anode (Toebes, M. L., et al., *Catalysis Today,* 2002). The polyaromatic compounds have a low but finite vapor pressure at 700° C.

Only small amounts of carbonaceous residue are apparently sufficient to increase the conductivity substantially. Although the inventors do not know precisely what the chemical form of the residue might be, the quantity necessary to significantly enhance performance appears to correspond to no more than about 10 wt %, preferably no more than about 5 wt %, and most preferably no more than about 2 wt %, based on the total weight of the electrode. If the density for the residue is assumed to be about 1 g/cm$^3$, a value typical for hydrocarbons, the volume fraction of this residue is less than 5%, based on the volume of the electrode. If the density for the residue is assumed to be more similar to that of graphite, the volume occupied by the residue would be even lower.

Another advantage of treating the electrode with hydrocarbon to form carbonaceous deposits is that even lower amounts of ion or electron conducting materials are required. By comparison, the minimum metal content for metal-containing cermet anodes and cathodes is reported to be about 30 vol % (Dees, D. W., et al., *J. Electrochem. Soc.,* 134, 2141 (1987)). A feature of various embodiments of the invention is that it is possible to operate direct-oxidation fuel cell with substantially no metal contents (e.g., less than about 5% by weight metal all the way down to no metal) and still obtain reasonable performance.

Another feature of an embodiment of the invention is a SOFC that comprises an air electrode (cathode), a fuel electrode (anode), and a solid oxide electrolyte disposed at least partially between these two electrodes. In a SOFC, the electrolyte is in solid form. Any material now known or later discovered can be used as the cathode material and as the electrolyte material. Typically, the electrolyte is made of a nonmetallic ceramic, such as dense yttria-stabilized zirconia (YSZ) ceramic, the cathode is comprised of doped lanthanum manganite. In the solid oxide fuel cell, hydrogen or a hydrocarbon is commonly used as the fuel and oxygen or air is used as the oxidant. Other electrolyte materials useful in the invention include Sc-doped $ZrO_2$, Gd- and Sm-doped $CeO_2$, and LaGaMnOx. Cathode materials useful in the invention include composites with Sr-doped $LaMnO_3$, $LaFeO_3$, and $LaCoO_3$, or metals such as Ag.

Another feature of an embodiment of the invention includes a method of making the above-described anode. In accordance with the method, it is preferred first to form a powder of yttria stabilized zirconia (YSZ), or other electrolyte material (hereinafter referred to as "YSZ" for convenience purposes) and tape casting to form a two-layer, green tape of YSZ (one layer for the anode and the other for the electrolyte). The two-layer green tape then preferably is sintered at temperatures within the range of from about 1,200 to about 1,800° C., preferably from about 1,350 to about 1,650° C., and most preferably from about 1,500 to about 1,550° C. to form a porous matrix of YSZ. The porosity of the porous matrix preferably is within the range of from about 45% to about 90%, more preferably within the range of from about 50% to about 80% and most preferably about 70%, by water-uptake measurements, (Kim, H., et al., *J. Am. Ceram. Soc.,* 85, 1473 (2002)). Sintering the two-layer tape in this manner results in a YSZ wafer having a dense side, approximately 40 to about 80 µm thick, more preferably about 60 µm thick, supported by a porous layer, approximately 400 to about 800 µm thick, more preferably about 600 µm thick. The dense side of the YSZ wafer serves as the electrolyte.

The cathode can be formed by applying the cathode composition (e.g., a mixture of YSZ and $La_{0.8}Sr_{0.2}MnO_3$) as a paste onto the dense side of the wafer and then calcining the cathode at a temperature within the range of from about 1,000 to about 1,300° C., more preferably within the range of from about 1,100 to about 1,200° C., and most preferably about 1,130° C.

The anode preferably is formed by impregnating the porous YSZ portion of the wafer with an aqueous solution containing a second ceramic material, or precursor thereof. For example, the porous YSZ portion can be impregnated with an aqueous solution containing the appropriate concentrations of the nitrate salts of La, Sr, and Cr (for LSC). For example, preferred salts useful for forming the porous anode include at least saturated, aqueous solutions of $La(NO_3)_3$, $Sr(NO_3)_3$. The impregnated porous ceramic material then preferably is calcined at a temperature sufficient to decompose the nitrate ions and form the conductive, perovskite phase. The calcination temperature preferably is lower than the temperature at which solid state reactions occur between the oxides of the electronically conductive material and the porous ceramic matrix. For example, when LSC is used as the anode material, calcination preferably is carried out at a temperature within the range of from about 800 to about 1200° C., more preferably from about 1,000 to about 1,200° C., and most preferably about 1,100° C.

The conductive phase of the anode of the invention therefore can be formed at relatively low temperatures; temperatures lower than the temperature in which solid state reactions would occur. Thus, the porous ceramic matrix may be impregnated with the nitrate solutions described above, and then the conductive phase formed when the fuel cell is heated to its operating temperature. This provides a distinct advantage and significant savings in manufacturing costs. These low temperatures also can avoid the appearance of secondary phases but still provide anodes having a conductive phase that conventionally required sintering at much higher temperatures.

In addition, forming the second ceramic material in this manner at the lower temperatures described herein can avoid the formation of undesirable insulating phases like $La_2Zr_2O_7$ and $SrZrO_3$. The method preferably avoids or negates the need to modify the properties of the electronically conductive second oxide material to match the CTE of the ionically conductive first ceramic oxide in the composite anode. That is, the electronically conductive second ceramic oxide material need not have the same CTE as the electrolyte because the physical structure of the anode is defined primarily by the ionically conductive first ceramic oxide material that makes up the porous material. This allows significantly more flexibility in the choice of materials that can be used as the second ceramic material.

An alternative method of disposing the second ceramic material at least partially within the pores of the porous first ceramic material includes impregnating the pores with colloidal particles of the second ceramic material, e.g., $LaCrO_3$. So long as the colloidal particles are small enough to fit in the pores of the porous first ceramic material, the colloidal impregnation technique can be effective in coating the pores of the first ceramic material.

The amount of second ceramic material employed in the anode preferably ranges from about 1 to about 75% by weight, more preferably from about 10 to about 60%, and most preferably about 25 to about 50% by weight, based on the total weight of the anode. Additional catalytic and electronic materials may be impregnated into the porous composite. For example, ceria is known to enhance the oxidation activity of anodes for direct oxidation of hydrocarbons. Ceric can be added to the composite anode material containing the first and second ceramic materials by addition of an aqueous solution of $Ce(NO_3)_2$. Similarly, small amounts of Cu can be added to the anode composite material to enhance the electronic conductivity.

Figure 7:
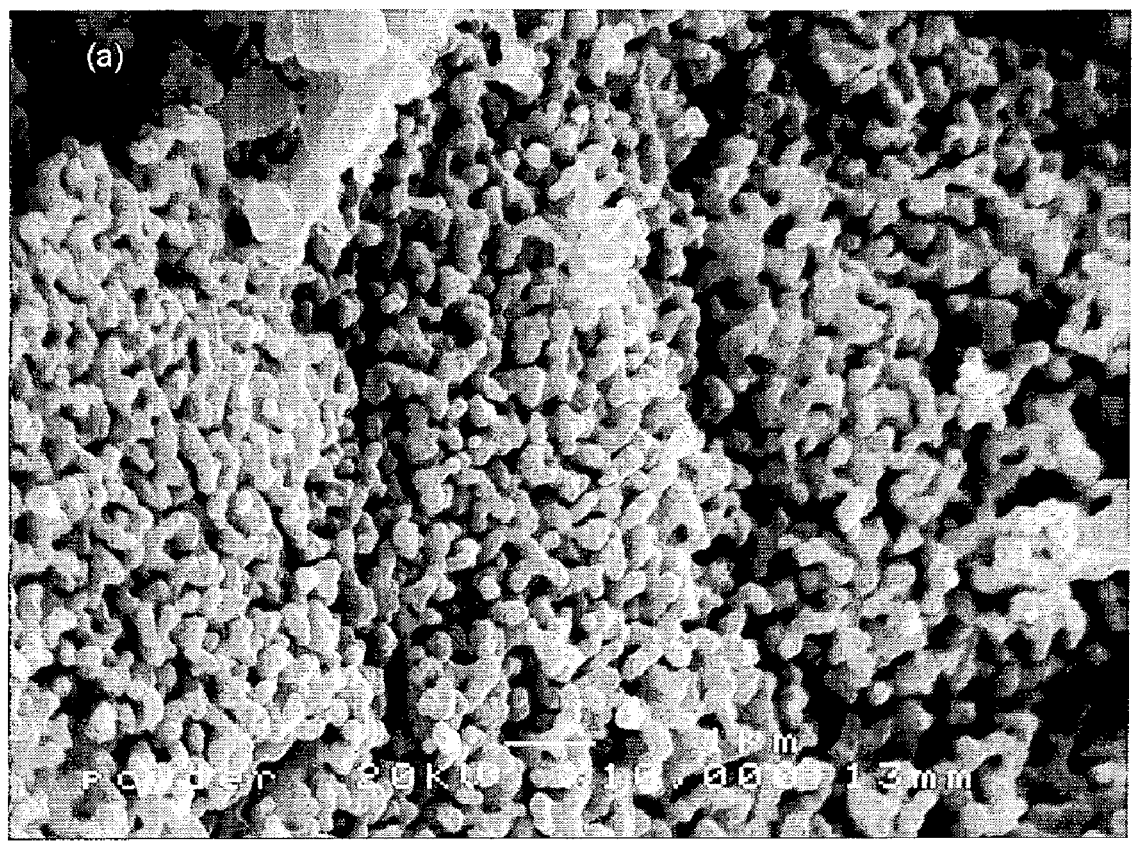
FIG. 7 is an SEM microstructure of a LSC/YSZ composite manufactured using conventional methods (a).
Figure 8:
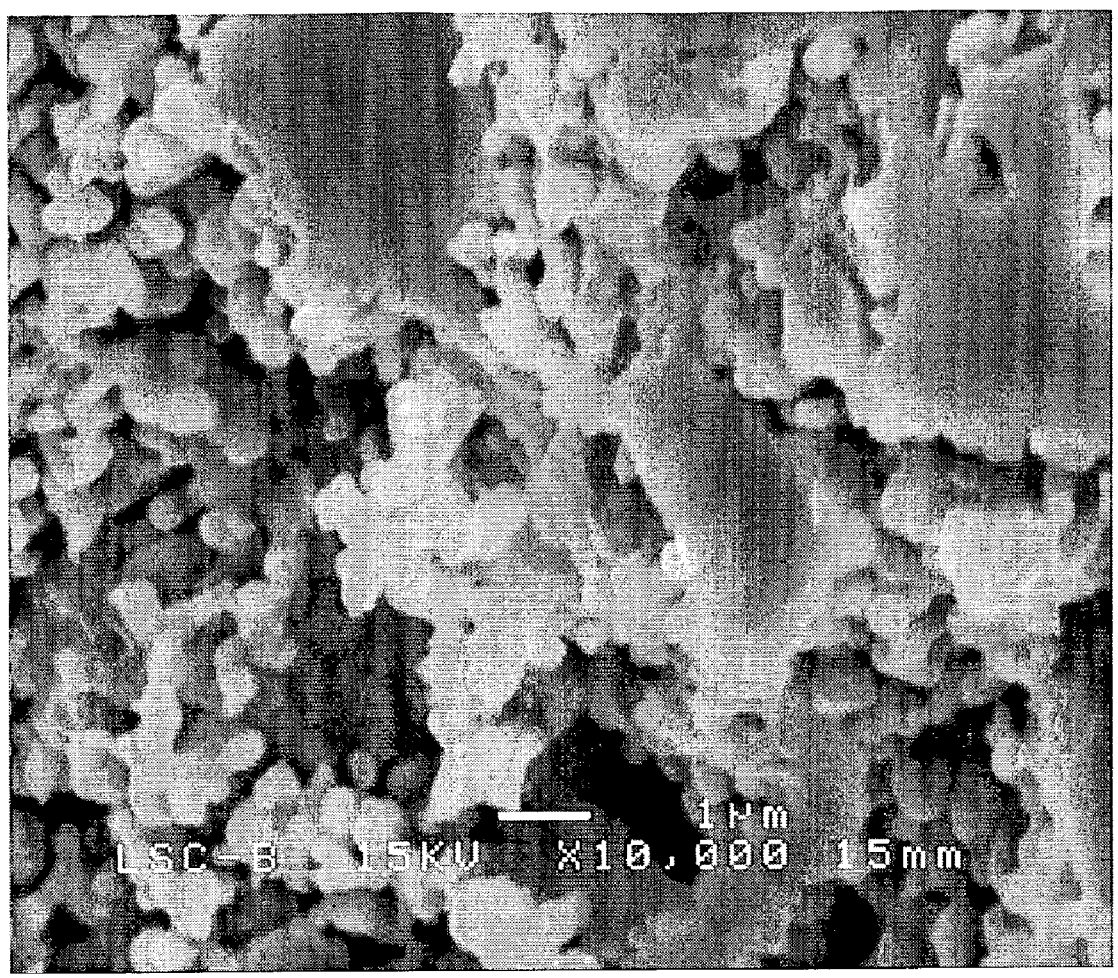
FIG. 8 is an SEM microstructure of an LSC/YSZ composite manufacture in accordance with the inventive method (b).

The anodes of the present invention have increased electrical conductivity at much lower concentrations of the electronically conducting material, when compared to conventional electrodes. In addition, the anodes of the invention exhibit percolation behavior at much lower concentrations, when compared to conventional anodes which is believed to be due to the fact that the conductive phase is not random, but coats the pores of the oxide matrix. The microstructure of the fracture interfaces of LSC/YSZ prepared in accordance with a conventional method (e.g., mixing the powders together and sintering—method a), and prepared in accordance with the invention (e.g., forming a porous YSZ layer, impregnating the layer with solutions of cathodic material, and then heating—method b) are shown in FIGS. 7 and 8. It can be seen that the particles of YSZ and LSC were completely dispersed into each other for the conventional method a. For these electrodes, the conductivity is almost the same as that of YSZ at lower ion conducting particle loading, and percolation behavior will occur only at relatively high concentrations of ion conducting material.

While not intending on being bound by any theory, the inventors believe that the percolation behavior can be explained by the presence of two conduction mechanisms through the composite electrode: (i) an electronic path through LSC as an anode; and (ii) an ionic path through both YSZ and LSC. Below the percolation threshold, the conductivity of the composite is similar to that of YSZ, indicating only an ionic conduction path through the YSZ phase. Above the percolation threshold, the conductivity will be greatly enhanced, which corresponds to a change in mechanism from ionic conduction to electronic conduction through the LSC perovskite. For the inventive electrodes (method b), the solution containing the precursor salts to LSC can be adsorbed throughout the interface of porous YSZ. A nanometer particle layer or a thin film of the conductive oxide phase comprising the second ceramic material can be formed relatively homogeneously along the surface of YSZ after sintering, resulting in improved LSC particle-to-particle contact even at low concentration. Therefore the continuous conductive perovskite phase of the second ceramic material can increase the conductivity, and the percolation threshold for the conductivity can be found at lower loading. For conventional electrodes (method a), the percolation threshold is at much higher concentrations of ion conducting material due to its admixture with the YSZ.

The inventive anodes preferably have a porous structure with a plurality of pores having a pore size greater than about 0.5 µm. Not all the pores need to have a pore size greater than about 0.5 µm, but it is preferred that more than 50%, preferably more than 60% and most preferably more than 75% of the pores have a pore size greater than about 0.5 µm. The pore size can be determined by measuring the distance along the major dimension of the pore. It is preferred in the present invention that a plurality of pores have a pore size greater than about 0.75 µm, more preferably greater than about 1 µm, and even more preferably greater than about 1.5 µm.

The porosity of the anode prior to dispersing the ion conducting material typically is about 55 to about 75%. The porosity preferably is measured by immersing the sintered product in water and comparing its weight after immersion with that prior to immersion, as described in Kim, H., et al., *J. Am. Ceram. Soc.*, 85, 1473 (2002). The difference yields the weight of water dispersed in the pores, which when divided by the density will yield the volume of the pores. The porosity then can be determined simply by dividing the volume of the pores by the total volume of the sintered product. Most preferably, the porosity of the sintered electrolyte product prior to dispersing the electronically conducting material is about 60%.

The porosity of the electrode after dispersing the electronically conductive second ceramic material can be anywhere from about 10% to about 75%, more preferably from about 10% to about 40% and most preferably from about 12% to about 30%. The porosity of the electrode will depend in part on the amount of electronically conducting material used, as shown in FIG. 1.

The invention now will be explained with reference to the following non-limiting examples

EXAMPLES

An LSC-YSZ composite electrodes was prepared by two methods: (a) Method A involved conventional, physical mixing of the oxide powders; and (b) Method B involved impregnation of a porous YSZ matrix with metal salts.

Comparative Method (a)

For the conventional composites, the YSZ and was used as purchased commercially from Tosoh Corporation, Tokyo, Japan. The LSC ($La_{0.7}Sr_{0.3}CrO_{3-\delta}$) was synthesized from the nitrate salts of La, Sr and Cr. After dissolving the La, Sr, and Cr salts in distilled water, the mixture was dried and calcined at 800° C. in air overnight. This powder then was ground in a mortar and pestle in the presence of iso-propanol, sintered in air at 1400° C. for 4 h, and then ground again. The resulting powder was shown to have the correct perovskite structure by x-ray diffraction (XRD) measurements. Finally, the LSC-YSZ composites were prepared by physically mixing the oxide powders, uniaxially pressing them into wafers, and calcining the wafers to various temperatures, as described in more detail below.

Inventive Method (b)

To prepare composites by impregnation, Method B, a porous YSZ matrix first was prepared using methods described, for example, in Gorte, R. J., et al., *Adv. Materials*, 12, 1465 (2000), and Park, S., et al., *J. Electrochem. Soc.*, 148, A443 (2001). The YSZ powder ($ZrO_2$ with 8 mol % $Y_2O_3$, Tosoh TZ-84) was used as received and mixed with distilled water, a dispersant (Duramax 3005, Rohm & Haas), binders (HA12 and B1000, Rohm & Haas), and pore formers (graphite and polymethyl methacrylate). This slurry was cast into tapes that would result in porous ceramic wafers, having a thickness of about 600 µm. After calcination to 1550° C., the YSZ wafers and rectangular pieces were found to have a porosity of 60%, as shown by the weight change of the sample after water immersion. Kim, H., et al., *J. Am. Ceram. Soc.*, 85, 1473 (2002). LSC then was added to the porous YSZ through impregnation of the YSZ with an aqueous solution containing the appropriate concentrations of the soluble salts of La, Sr, and Cr. Sufficient quantities of $La(NO_3)_3$, $Sr(NO_3)_3$, and $Cr(NO_3)_3$ were employed to prepare composites having concentrations of LSC within the range of about 30 to about 40 vol %.

The electrical conductivities were measured using a standard four-probe DC method. In this method, the samples were placed in a holder, and external platinum foils were attached to both ends. Current from a 1286 Solartron electrochemical interface was passed through the samples while monitoring the voltage across the samples using a Tenma 72-410A multimeter. The conductivities were typically measured either in air or in humidified $H_2$. The phase and microstructure of selected samples also were also investigated using XRD and Scanning Electron Microscopy (SEM, JEOL JSM-6300LV).

Example 1

A series of porous composites were prepared in accordance with Method b above to determine whether the electronically conducting oxide material was being dispersed within the porous matrix. The porosities of a series of materials with increasing amounts of LSC were measured, with the results shown in FIG. 1. The LSC-YSZ composites in this figure were calcined to 1,100° C. For these data, the volume of the conducting oxide was determined from its mass and bulk density. The line in the figure is the expected change in porosity of the composite assuming the second oxide fills the pores. The fact that the porosity decreases as expected demonstrates that the electronically conducting oxide material is present in the pore structure following the calcination treatments.

As shown in FIG. 1, the porosity of the LSC-YSZ composite decreases from 60% by volume (e.g., porosity of YSZ matrix) at 0% LSC, to 0% at about 64% by volume LSC. It is most preferred that the concentration of LSC in the composite be on the order of about 30-35% by volume, leaving a porosity of the electrode at or about 30-35%.

Example 2

Figure 2:
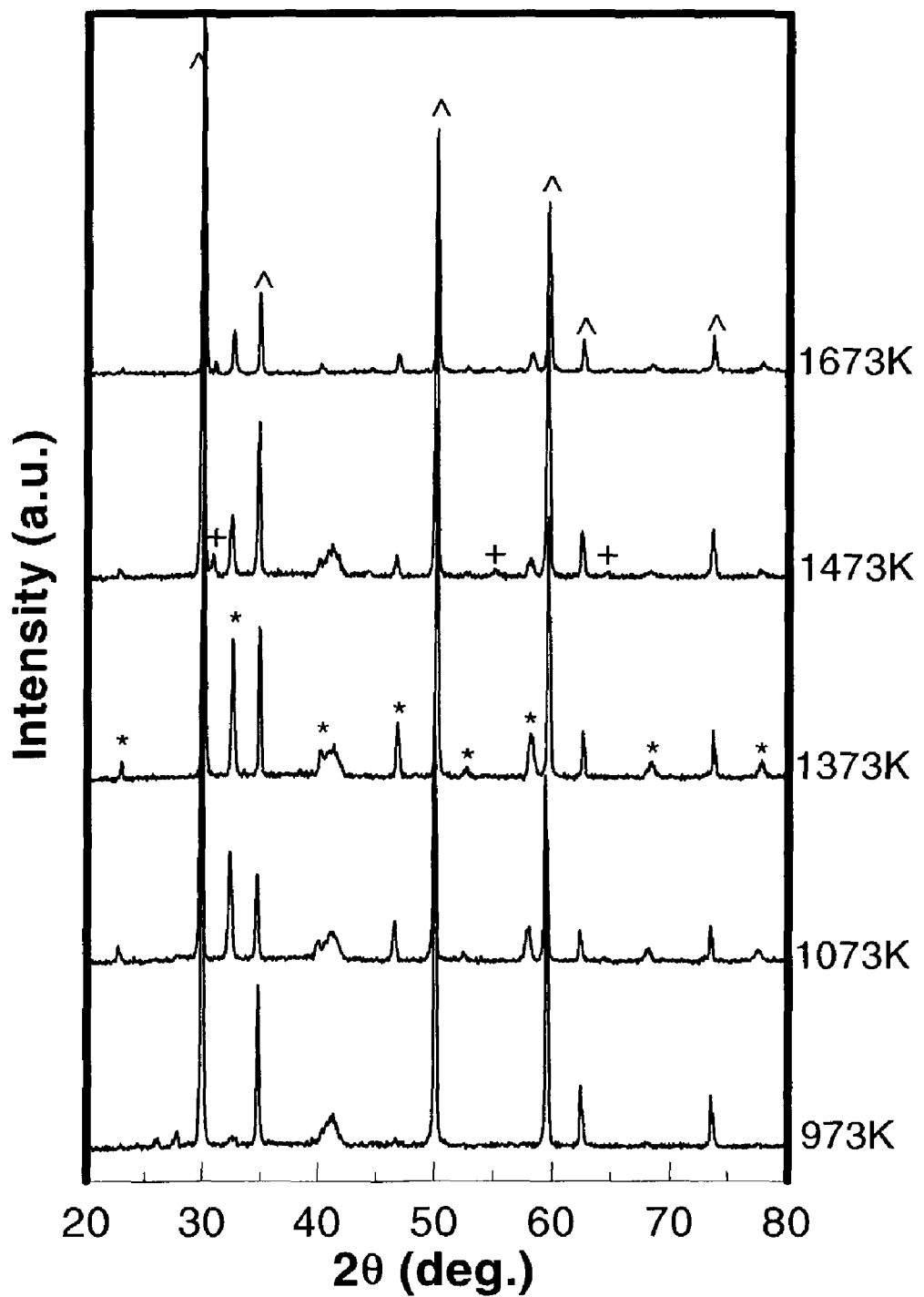
FIG. 2 illustrates XRD patterns of a LSC/YSZ composite at different calcination temperatures.

LSC-YSZ composites that are useful as anode materials were prepared in accordance with method b above. To determine the optimum calcination temperature, method b was repeated at different temperatures, the results of which are shown in FIG. 2. FIG. 2 shows the XRD patterns following impregnation of the porous YSZ with the La, Sr, and Cr salts to a loading that would correspond to about 30 vol wt % LSC, after calcining to increasingly higher temperatures. Peaks corresponding to the LSC, perovskite phase (notably, those at 41, 46, 58, 68, and 78 degrees 2θ) become apparent beginning at approximately 800° C. These peaks become sharper after calcination to 1,100° C., but new phases appear at still higher calcination temperatures. By 1,200° C., a peak appears at 31 degrees, which is believed to be attributed to the formation of $SrZrO_3$. For calcination temperatures below 1,400° C., there are also several overlapping peaks in the region near 41 degrees, which are probably associated with chromium compounds, such as $CrO$, $CrO_2(OH)_y$, and $Cr(OH)_y$. To prevent the formation of undesirable components that may have an adverse impact on the performance of the composite, it is preferred to prepare the composite at calcination temperatures below those in which solid state reactions occur. In this case, it is most preferred to prepare the composite at a calcination temperature of less than about 1,200° C.

Example 3

Figure 3:
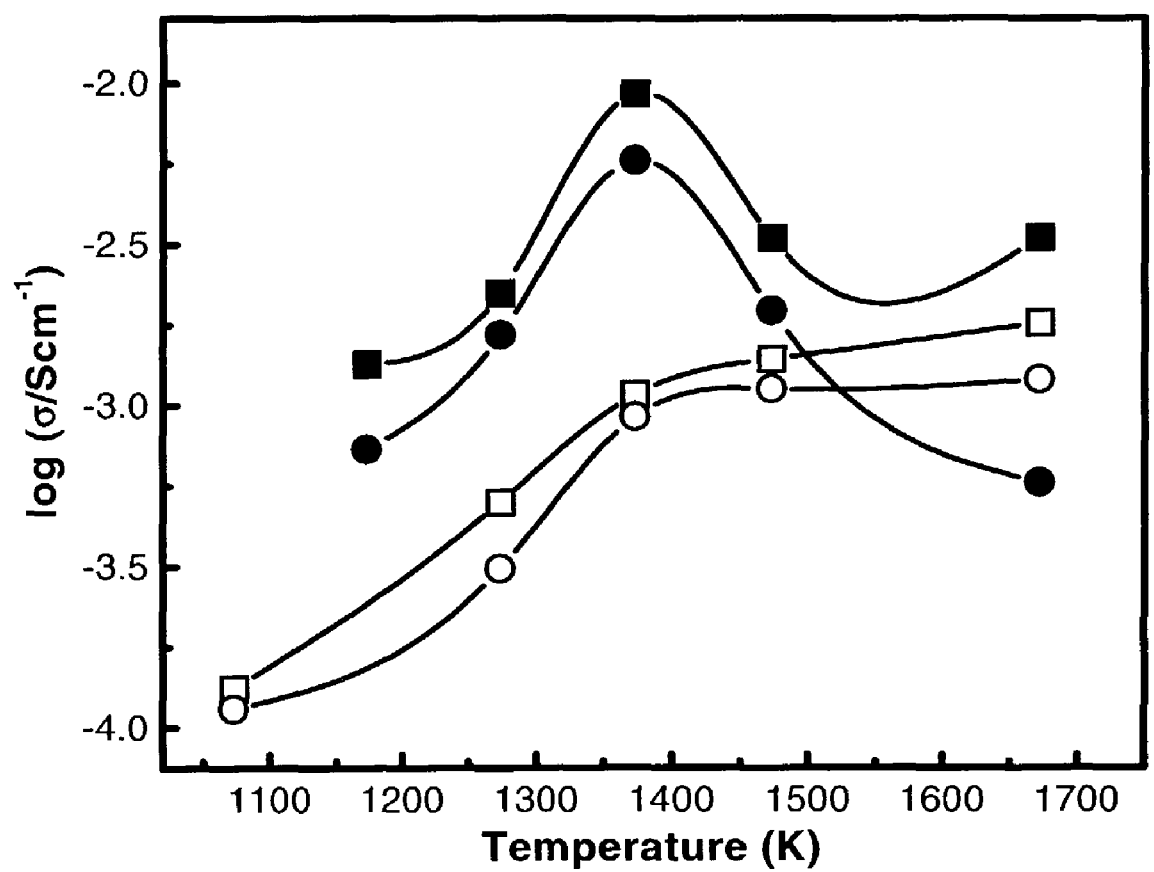
FIG. 3 is a graph showing the changes in electrical conductivity of a LSC/YSZ composite with calcination temperature.

The purpose of this example was to study the effect of calcination temperature on the electronic conductivity of the composite, the results of which are shown in FIG. 3. Two LSC-YSZ composites were prepared, both having 30 vol % LSC, but one prepared using method a and the other prepared using method b described above. The samples were calcined in air for 2 hours at various temperatures before measuring the conductivities 700° C. in both air and humidified $H_2$. For the composite prepared in accordance with method b, the conductivity was found to increase with temperature to a maximum value at or about 1,100° C., and then to decrease at still higher calcination temperatures. This is consistent with the formation of an LSC phase at 1,100° C., followed by formation of secondary phases at higher temperatures. It also is interesting that the conductivity of the composite formed at the highest temperature is sensitive to the gas-phase composition, while the composite formed at 1,100° C. is not. Since LSC remains conductive over a wide range of $P(O_2)$, this observation is further evidence that the high-temperature phase is not LSC.

For the composite prepared using method a, the conductivity increases with increasing temperature, all the way to 1,400° C., and there is not much difference between the conductivities measured in air and in $H_2$. The reason for the increased conductivity with calcination temperature is very different in this case, since the conductive LSC phase was used in the initial sample preparation. For these samples, the initial density was low and calcination enhanced the connectivity within the sample. The rather small increase in conductivity observed between the sample heated to 1,100° C. and the one heated to 1,400° C. may be due to counteracting effects, with the formation of secondary phases decreasing the conductivity and densification increasing conductivity.

Example 4

Figure 4:
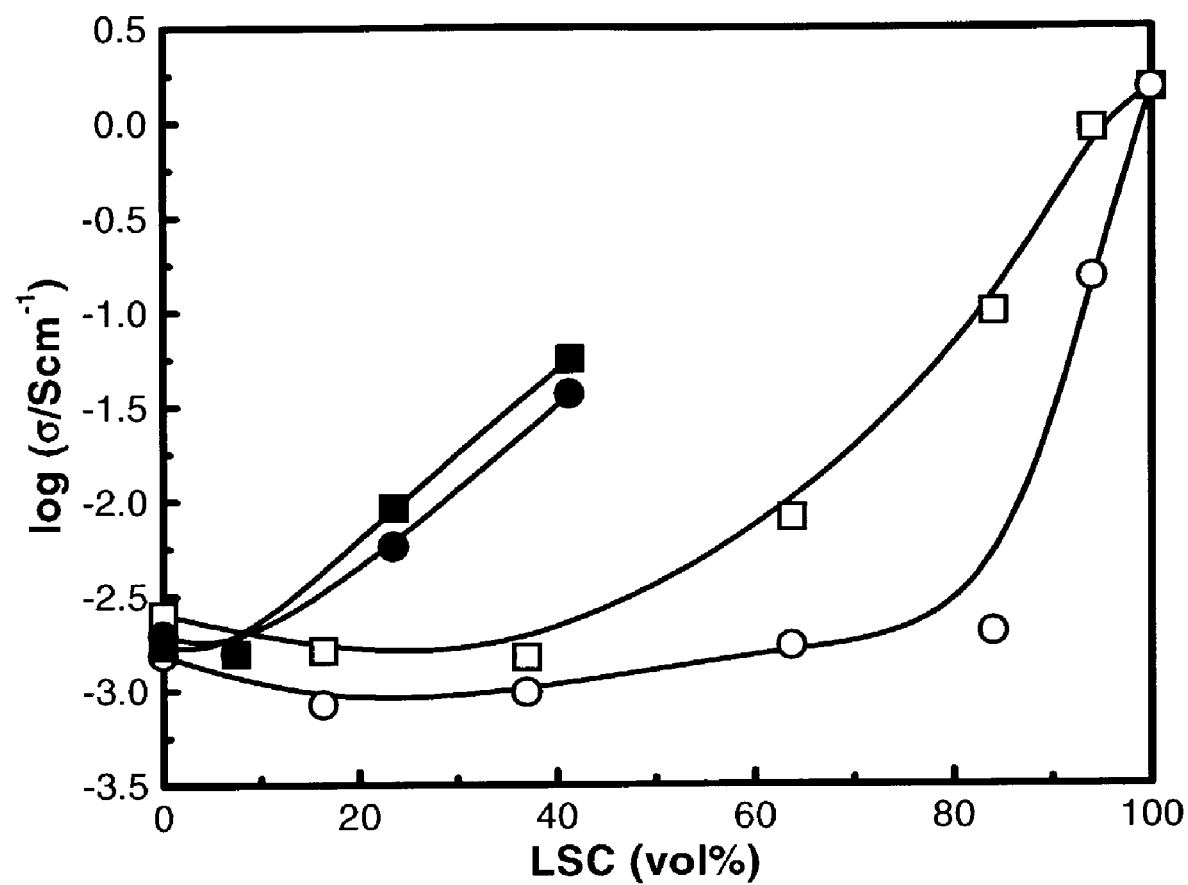
FIG. 4 is a graph showing the changes in electrical conductivity of a LSC/YSZ composite with concentration of LSC.

The purpose of this example was to study the effect of concentration of LSC on electronic conductivity, the results of which are shown in FIG. 4. Two LSC-YSZ composites were prepared, both calcined at 1,100° C. for 2 hours, but one prepared using method a and the other prepared using method b described above. The amounts of LSC employed by volume % were varied from 0 to about 100% (100% for the LSC-YSZ composite prepared in accordance with method a). The conductivities then were measured in both air and humidified $H_2$ at 700° C. The samples prepared by method b exhibited reasonably high conductivities at relatively low volume fractions of LSC. This is believed to be due in part to the fact that materials impregnated into a defined matrix cannot be considered random media. It is believed that in all likelihood, the LSC forms a coating on the walls of the YSZ pores.

For the comparative samples prepared from the mixed powders, method A, the conductivity was low until the weight fraction of LSC reached about 80%. The fact that such a high weight fraction of LSC is required, much higher than would be expected based on percolation concepts, is believed to be due to incomplete sintering and resulting low density of these powders at the low preparation temperature. It is not until the volume fraction of LSC reached about 80% that the material became denser, thereby increasing the conductivity.

The following examples study the effect of forming carbonaceous deposits on the composite ceramic anode materials.

Making the SOFC

The anodes were prepared as described above. A ceria containing ceramic anode was prepared as follows. The dense electrolyte layer and the porous YSZ matrix were prepared simultaneously by tape-casting methods. A two-layer, green tape of YSZ (yttria-stabilized zirconia, Tosoh, 8 mol % $Y_2O_3$, TZ-84) was made by casting a tape with graphite and polymethyl methacrylate (PMMA) pore formers over a green tape without pore formers. Firing the two-layer tape to 1800 K resulted in a YSZ wafer having a dense side, 60 µm thick, supported by a porous layer, 600 µm thick. The porosity of the porous layer was determined to be ~70% by water-uptake measurements Kim, H., et al., *J. Am. Ceram. Soc.*, 85, 1473 (2002). Next, a 50:50 mixture of YSZ and LSM ($La_{0.8}Sr_{0.2}MnO_3$, Praxair Surface Technologies) powders was applied as a paste onto the dense side of the wafer, then calcined to 1400 K to form the cathode. Third, the porous YSZ layer was impregnated with an aqueous solution of $Ce(NO_3)_3.6H_2O$ and calcined to 723 K to decompose the nitrate ions and form $CeO_2$. The porous layer was then impregnated with an aqueous solution of $Cu(NO_3)_2.3H_2O$ and again heated to 723 K in air to decompose the nitrates. All of the cells used in these examples contained 10 wt % $CeO_2$ and no metal.

Electronic contacts were formed using Pt mesh and Pt paste at the cathode and Au mesh and Au paste at the anode. Each cell, having a cathode area of 0.45 $cm^2$, was sealed onto 1.0-cm alumina tubes using Au paste and a zirconia-based adhesive (Aremco, Ultra-Temp 516).

Testing the SOFC and Inventive and Comparative Anodes

The solid oxide fuel cell prepared above was placed inside a furnace and heated to 973 K at 2 K/min in flowing $H_2$. $H_2$, $CH_4$, propane, and n-butane were fed to the cell undiluted, while toluene and decane were fed as 75 mol % mixtures with $N_2$. All hydrocarbons, including those that are liquids at room temperature, were fed directly to the anode without reforming, as described in Kim, H., et al., *J. Electrochem. Soc.*, 148, A693 (2001).

The performance at 973 K for each cell was measured by its V-I curves with n-butane and $H_2$ fuels, with impedance spectra providing additional information on selected samples. Since the cathodes and electrolytes were prepared in a similar manner in all cases, changes in the fuel-cell performance and in the impedance spectra can be attributed to changes in the anode. Since the fuel flow rates were always greater than 1 $cm^3$/s at room temperature, the conversion of the hydrocarbon fuels was always less than 1%, so that water produced by the electrochemical oxidation reactions was negligible. The impedance spectra were obtained in galvanostatic mode at close to the open-circuit voltage (OCV), using a Gamry Instruments, Model EIS300.

The amount of carbon present in the SOFC anode after treatment in n-butane also was measured. To accomplish this, anode cermet samples were exposed to flowing n-butane in a quartz flow reactor at 973 K for various periods of time. The sample weight or the amount of CO and $CO_2$ that formed upon exposure to flowing $O_2$ were then measured. In the weight measurements, the sample temperature was ramped to 973 K in flowing He, exposed to flowing n-butane for a limited period, and then cooled in flowing He. Following longer exposures, the samples were flushed in flowing He at 973 K for 24 hrs before cooling.

In the second method for measuring carbon contents in the anode, samples were exposed to n-butane in the flow reactor at 973 K and flushed with He. The sample then was exposed to a flowing gas consisting of a 15% $O_2$-85% He mixture while monitoring the reactor effluent with a mass spectrometer. The amount of carbon in the sample was determined from the amounts of CO and $CO_2$ leaving the reactor. The type of carbon formed was also characterized by temperature-programmed oxidation (TPO) in a similar manner. In these measurements, an anode sample was exposed to flowing n-butane at 973K for 30 min. The reactor was cooled to 298K in flowing He and again ramped to 973K at a rate of 10 K/min in a flowing gas mixture of 15% $O_2$-85% He.

In principle, TPO experiments carried out with a mass spectrometer would enable the calculation of carbon to hydrogen ratios as the detector should be able to determine the amount of hydrogen in the deposits; however, the background signal for water in the vacuum system was too high to allow accurate measurement of this quantity. A sample of 0.03 g of graphite powder (Alpha Aesar, conducting grade 99.995%) was placed in an identical reactor and heated in a 15% $O_2$-85% He stream at 10 K/min for comparison. SEM measurements of the graphite sample suggested that the particles were shaped as platelets, less than 10 µm in thickness.

Preparing and Testing Inventive Ceramic Anodes and SOFC

Example 5

Figure 5:
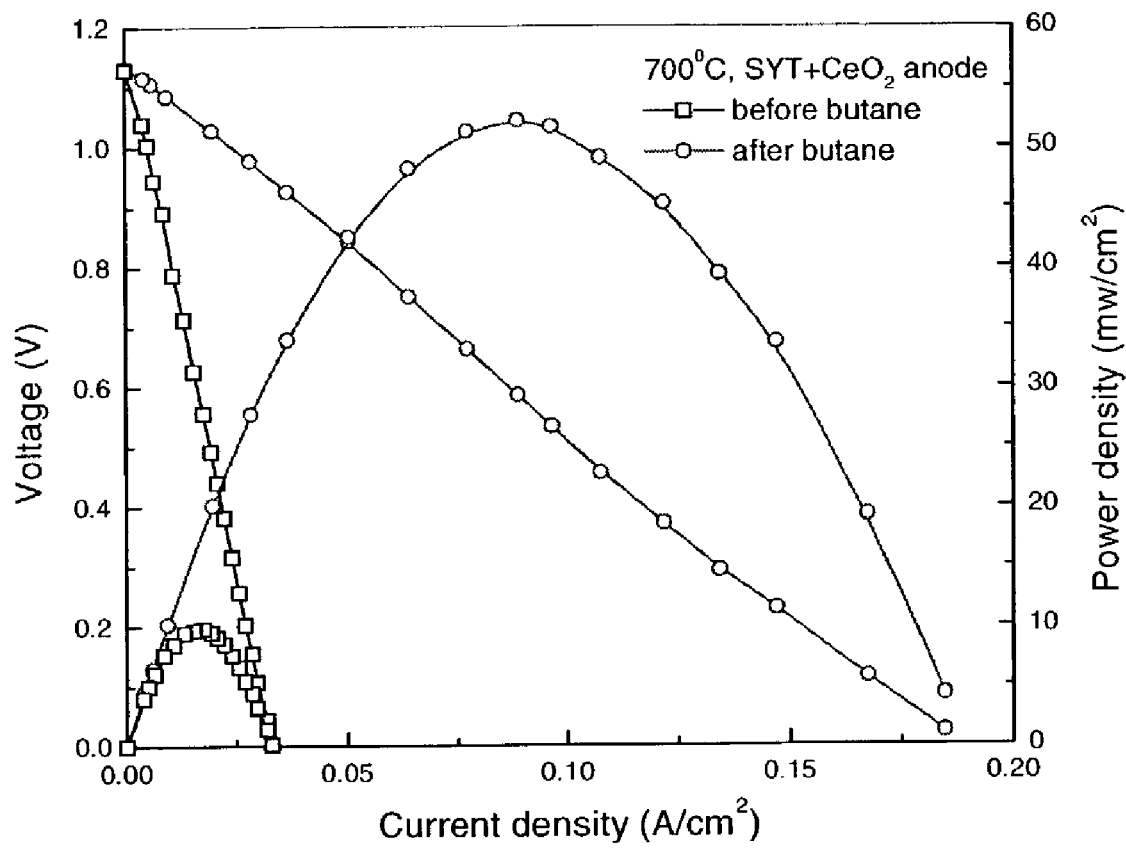
FIG. 5 is a graph showing the effects of forming carbonaceous deposits on the ceramic anode of the invention.

The SOFCs prepared above that contained ceria as the second ceramic material in the anode was tested in flowing $H_2$, before and after exposure to n-butane as described above, and the results are shown in FIG. 5. As shown in FIG. 5, superior performance was achieved by contacting the ceramic anode to butane, thus forming carbonaceous deposits on the anode.

Example 6

Figure 6:
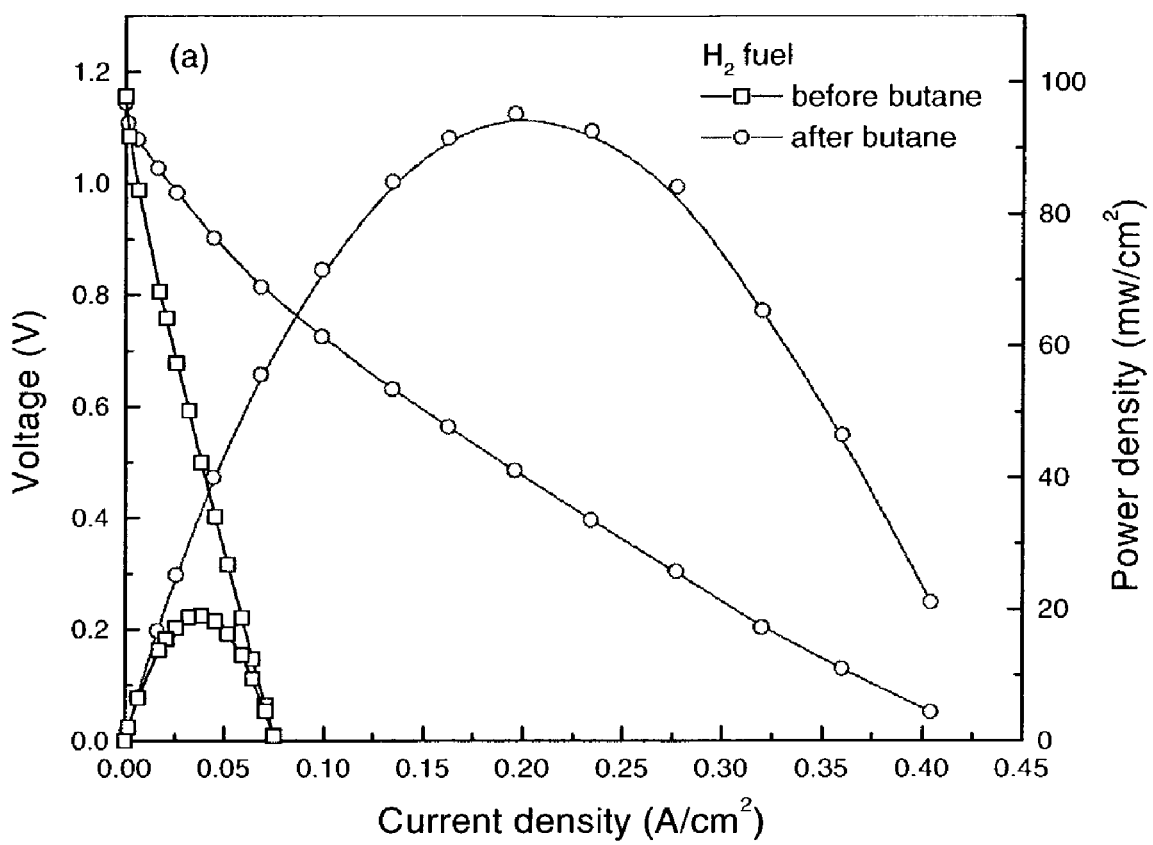
FIG. 6 is a graph showing the effects of forming carbonaceous deposits on the ceramic anode of the invention.

The SOFC prepared above by impregnating the porous YSZ with Sr-doped $LaCrO_3$ also was tested in flowing $H_2$, before and after exposure to n-butane as described above, and the results are shown in FIG. 6. As shown in FIG. 6, superior performance was achieved by contacting the ceramic anode to butane, thus forming carbonaceous deposits on the anode.

These examples reveal that treating the ceramic composite anodes of the invention with a hydrocarbon enhances the performance of the anode by forming carbonaceous deposits on the anode.

Other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A porous anode, comprising:
   a porous first ceramic material; and
   an electronically conductive material disposed along the inner walls of at least one pore of the porous first ceramic material,
   the electronically conductive material comprising a second ceramic material; the anode being produced by adding a salt of the second ceramic material to the porous first ceramic material;
   heating the resulting structure so as to give rise to the porous anode comprising the electronically conductive material being disposed along the inner walls of the pores of the porous ceramic first material, and
   there being substantially no metal added to the anode.

2. The anode as claimed in claim 1, wherein the first ceramic material is selected from the group consisting of YSZ, Gd- and Sm-doped ceria, Sc-doped $ZrO_2$, doped LaGaMnO, and mixtures thereof.

3. The anode as claimed in claim 2, wherein the first ceramic material is YSZ.

4. The anode as claimed in claim 1, wherein the second ceramic material is selected from the group consisting of ceria, Gd or Sm-doped ceria, $LaCrO_3$, $SrTiO_3$, Y-doped $SrTiO_3$, Sr-doped $LaCrO_3$, and mixtures thereof.

5. The anode as claimed in claim 4, wherein the second ceramic material is ceria.

6. The anode as claimed in claim 4, wherein the second ceramic material is LaCrO3.

7. The anode as claimed in claim 6, wherein the second ceramic material is Sr-doped LaCr03.

8. The porous anode according to claim 1, wherein the porous first ceramic material is sintered to an electrolyte.

9. The porous anode according to claim 1, wherein the porous first ceramic material is bonded to an electrolyte.

10. A solid oxide fuel cell comprising:
the anode of claim 1;
a cathode; and
an electrolyte disposed at least partially between the cathode and the anode.

11. The solid oxide fuel cell as claimed in claim 10, wherein the cathode is comprised of material selected from the group consisting of Sr-doped $LaMnO_3$, $LaFeO_3$, $LaCoO_3$, metals selected from Fe and Ag, and mixtures thereof.

12. The solid oxide fuel cell as claimed in claim 10, wherein the electrolyte is selected from the group consisting of YSZ, Sc-doped $ZrO_2$, Gd- and Sm-doped $CeO_2$, LaGaMnO, and mixtures thereof.

13. The solid oxide fuel cell as claimed in claim 10, wherein the first ceramic material of the anode is selected from the group consisting of YSZ, Gd- and Sm-doped ceria, Sc-doped $ZrO_2$, doped LaGaMnO, and mixtures thereof.

14. The solid oxide fuel cell as claimed in claim 13, wherein the first ceramic material is YSZ.

15. The solid oxide fuel sell as claimed in claim 10, wherein no metal is used in making the anode.

16. The solid oxide fuel cell as claimed in claim 10, wherein the second ceramic material used in the anode is selected from the group consisting of ceria, doped ceria such as Gd or Sm-doped ceria, $LaCrO_3$, $SrTiO_3$, Y-doped, $SrTiO_3$, Sr-doped $LaCrO_3$, and mixtures thereof.

17. The solid oxide fuel cell as claimed in claim 16, wherein the second ceramic material is ceria.

18. The solid oxide fuel cell as claimed in claim 17, wherein the
second ceramic material is Sr-doped $LaCrO_3$.

19. A porous anode, comprising:
a porous first ceramic material; and
an electronically conductive material disposed along the inner walls of at least one pore of the porous first ceramic material,
the electronically conductive material comprising a second ceramic material;
the anode being produced by
adding a salt of the second ceramic material to the porous first ceramic material;
heating the resulting structure so as to give rise to the porous anode,
the porous anode comprising electronically conductive material disposed along the inner walls of the pores of the porous ceramic first material,
the anode containing less than about 5% weight metal, based on the total weight of the anode.

20. The porous anode according to claim 19, wherein the porous first ceramic material is sintered to an electrolyte.

21. The porous anode according to claim 19, wherein the porous first ceramic material is bonded to an electrolyte.

* * * * *